(12) United States Patent  
Fujibayashi

(10) Patent No.: US 8,213,060 B2  
(45) Date of Patent: Jul. 3, 2012

(54) IMAGE READING APPARATUS

(75) Inventor: Mitsuyuki Fujibayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 483 days.

(21) Appl. No.: 12/575,149

(22) Filed: Oct. 7, 2009

(65) Prior Publication Data

US 2010/0085614 A1 Apr. 8, 2010

(30) Foreign Application Priority Data

Oct. 8, 2008 (JP) ................................ 2008-261753

(51) Int. Cl.
 *H04N 1/04* (2006.01)
(52) U.S. Cl. ......... 358/474; 358/496; 358/497; 358/486
(58) Field of Classification Search .................. 358/474, 358/497, 496, 486, 482
 See application file for complete search history.

(56) References Cited

U.S. PATENT DOCUMENTS

| | | | | |
|---|---|---|---|---|
| 5,418,604 | A * | 5/1995 | Nagakura et al. | 399/16 |
| 6,883,979 | B2 * | 4/2005 | Ueda et al. | 400/59 |
| 2006/0146375 | A1 * | 7/2006 | Baek | 358/474 |
| 2008/0225357 | A1 * | 9/2008 | Ohara et al. | 358/498 |

FOREIGN PATENT DOCUMENTS

| | | |
|---|---|---|
| JP | 2003-118218 A | 4/2003 |
| JP | 2006-033419 A | 2/2006 |
| JP | 2007-079375 A | 3/2007 |
| JP | 2007-110466 A | 4/2007 |

* cited by examiner

*Primary Examiner* — Negussie Worku
(74) *Attorney, Agent, or Firm* — Canon USA Inc IP Division

(57) ABSTRACT

An image reading apparatus includes a document positioning plate configured to position a document thereon, a document pressing unit which is attached to the document positioning plate to be openable and closable, a reading sensor which is movably arranged in a main body of the apparatus and configured to read an image of the document positioned on the document positioning plate, and a restricting unit configured to engage with the reading sensor to restrict a movement of the reading sensor, wherein the restricting unit has a lever which is provided in the document pressing unit in a rotatable and storable manner and urged in a direction in which the lever is stored and restricts the movement of the reading sensor in a state that the document pressing unit is closed and the lever is inserted into the main body of the apparatus, and when the document pressing unit is opened from the restricting state, the lever is pulled out from the main body of the apparatus to release the restriction and urged to be stored in the document pressing unit.

8 Claims, 11 Drawing Sheets

1

IMAGE READING APPARATUS

BACKGROUND OF THE INVENTION

1. Field of the Invention

The present invention relates to an image reading apparatus which moves a reading sensor to read an image of a document positioned on a document positioning plate and has a restricting unit configured to restrict the movement of the reading sensor.

2. Description of the Related Art

Until now, there has been known a configuration which moves a reading sensor to read an image of a document positioned on a document positioning plate in a copying machine, a facsimile apparatus, and a scanner which are equipped with an image reading apparatus. In the configuration which moves the reading sensor, the reading sensor is configured to be fixed in the apparatus to prevent the reading sensor from moving in the apparatus during transportation of the apparatus and damaging the apparatus. The configuration in which the reading sensor is fixed in the apparatus needs a separate configuration for releasing the reading sensor from being fixed when it is used.

Japanese Patent Application Laid-Open No. 2007-79375 discusses a configuration in which an operation lever is operably provided on a surface of a housing and a latching groove of a scanner carriage is engaged with a latching protrusion of the operation lever to fix the scanner carriage to a fixing position. However, this configuration has a problem in that a user needs to release the fixing of the scanner carriage and, if the user inadvertently forgets to release the fixing of the scanner carriage, the scanner carriage cannot be moved. Further, there is another problem in that if the scanner carriage is not moved in response to operation instructions issued by the user to the apparatus, this is mistaken for a breakdown of the apparatus.

SUMMARY OF THE INVENTION

The present invention is directed to an image reading apparatus capable of surely releasing a lock of a reading sensor without increasing size of the apparatus in a configuration in which the reading sensor can be locked during transportation of the apparatus.

According to an aspect of the present invention, an image reading apparatus includes a document positioning plate configured to position a document thereon, a document pressing unit which is attached to the document positioning plate to be openable and closable, a reading sensor which is movably arranged in a main body of the apparatus and configured to read an image of the document positioned on the document positioning plate, and a restricting unit configured to engage with the reading sensor to restrict a movement of the reading sensor, wherein the restricting unit has a lever which is provided in the document pressing unit in a rotatable and storable manner and urged in a direction in which the lever is stored and restricts the movement of the reading sensor in a state that the document pressing unit is closed and the lever is inserted into the main body of the apparatus, and when the document pressing unit is opened from the restricting state, the lever is pulled out from the main body of the apparatus to release the restriction and urged to be stored in the document pressing unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1:
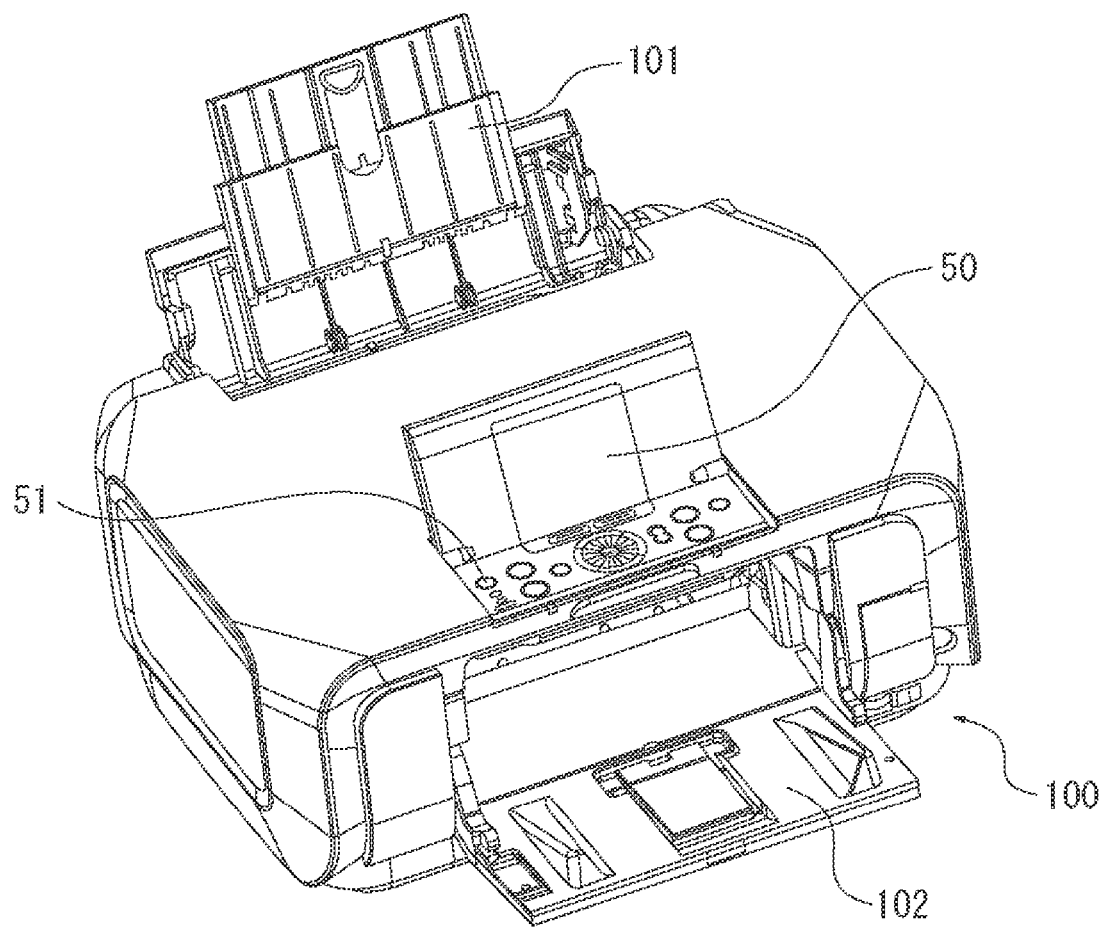
FIG. 1 is a perspective view of an image reading and recording apparatus viewed from the top according to an exemplary embodiment of the present invention.

Various exemplary embodiments, features, and aspects of the invention will be described in detail below with reference to the drawings. The same reference numerals denote the similar or corresponding parts throughout the drawings.

Figure 2:
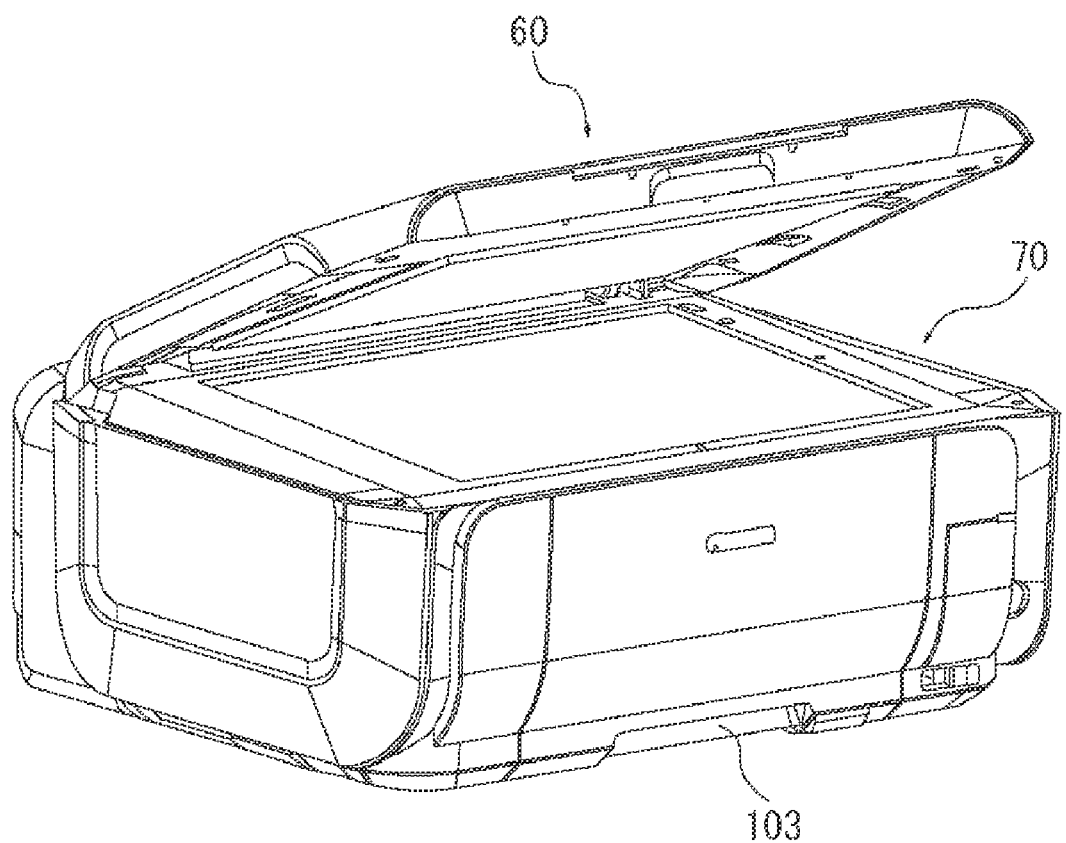
FIG. 2 is a perspective view of the image reading and recording apparatus.

FIG. 1 is a perspective view of an image reading and recording apparatus viewed from the top according to an exemplary embodiment of the present invention. FIG. 2 is a perspective view of the image reading and recording apparatus.

An image reading and recording apparatus 100 integrates an image reading apparatus configured to read an image of a document and a recording apparatus configured to record the image on a recording medium. In the image reading and recording apparatus 100, a feeding tray 101 stacks thereon a recording medium on which an image is recorded by the recording apparatus, a feeding cassette 103 is detachably provided on a front of the apparatus and stacks the recording medium thereon, and a sheet discharge tray 102 stacks thereon the recording medium on which the image is recorded by the recording apparatus.

A document reading unit 70 reads an image of a document. A document pressing unit 60 is attached to the document reading unit 70 to be openable and closable. A liquid crystal screen 50 which serves as a graphic user interface is rotatably mounted on the document pressing unit 60. A power supply switching button 51 for starting the main body of the apparatus is arranged in a position facing the liquid crystal screen 50.

The operation of the image reading and recording apparatus 100 is described below. The recording medium stacked on the feeding tray 101 or the feeding cassette 103 is conveyed to a recording unit by a feeding unit and a conveying unit. An image is recorded on the recording medium in such a manner as to repeat intermittent conveyance of the recording medium conveyed to the recoding unit by the conveyance unit, reciprocating movement of a carriage on which a recording head is mounted on the recording medium, and ink discharge of the recording head on the recording medium. The recording medium on which the image is recorded is discharged to the sheet discharge tray 102 by a sheet discharge unit.

Record data to be recorded on the recording medium is inputted to the image reading and recording apparatus via a personal computer (PC). Record data may be inputted by connecting a media on which image data is recorded to the image reading and recording apparatus or directly connecting a digital camera thereto. Image data read from a document by the image reading apparatus of the image reading and recording apparatus may be recorded on the recording medium by the recording apparatus.

Figure 3:
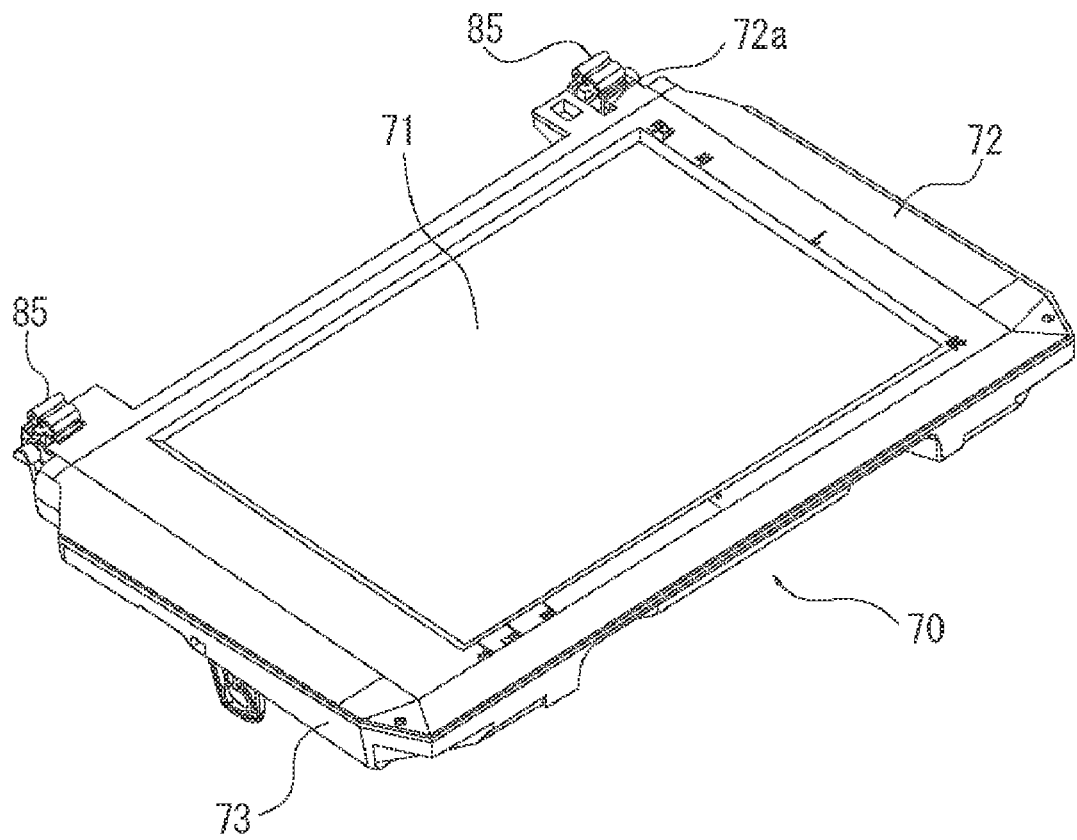
FIG. 3 is a perspective view of an image reading apparatus.

The image reading apparatus includes a document reading unit and a document pressing unit. FIG. 3 is a perspective view of the image reading apparatus. A document positioning plate (a document positioning glass plate) 71 is configured to position a document thereon. A document reading box 73 is an area where a below-described reading sensor moves. A document reading cover 72 covers the document reading box 73 and has an opening for a positioning surface of the document positioning plate 71. The document reading cover 72 is also a covering member.

Figure 4:
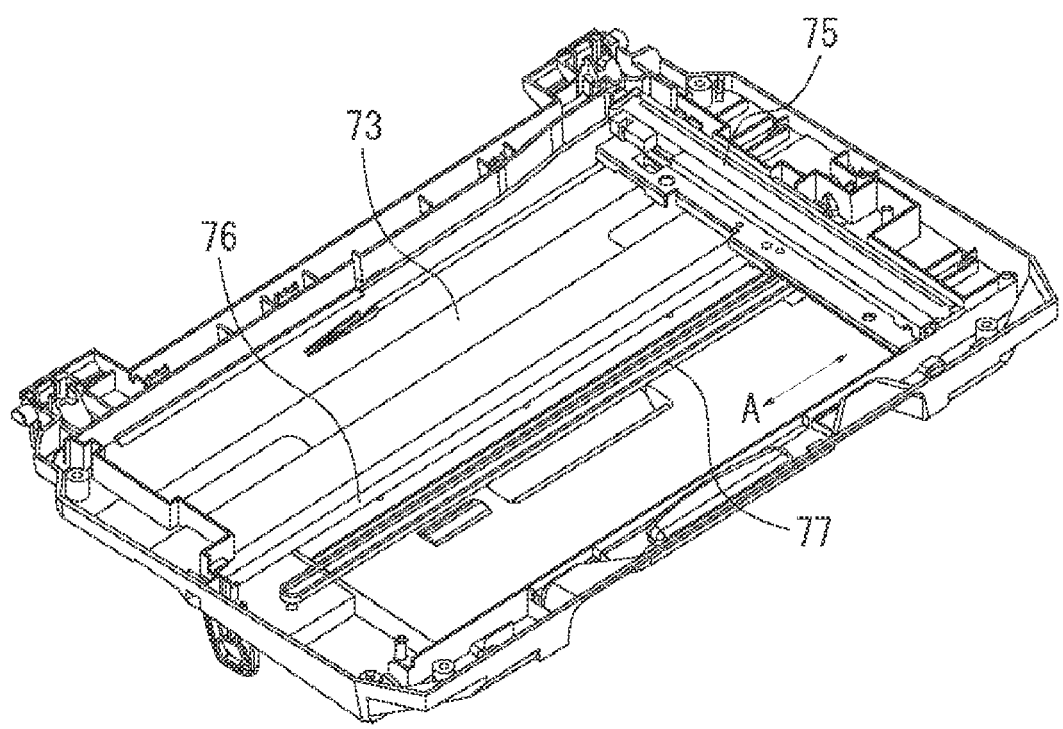
FIG. 4 is a perspective view illustrating inside of the image reading apparatus.

FIG. 4 is a perspective view illustrating the interior of the image reading apparatus. FIG. 4 illustrates the image reading apparatus in FIG. 3 from which the document positioning plate 71 and the document reading cover 72 are removed. In FIG. 4, a shaft 76 extending to a direction A indicated by an arrow in the figure is arranged on the document reading box 73.

A reading sensor 75 emits light on a document, forms an image of light reflected therefrom, and converts the image to an electric signal. The reading sensor 75 is guided while being fitted into a shaft 76 and movable to the direction A indicated by the arrow in the figure. A belt 77 transmits drive of a motor (not shown) to the reading sensor 75.

In the above configuration, the reading sensor 75 reads an image of a document placed on the document positioning plate 71 by moving in the direction A indicated by the arrow in the figure. The image data obtained by reading the image of the document can be transmitted to a PC or recorded on the recording medium by the recording apparatus.

Figure 5:
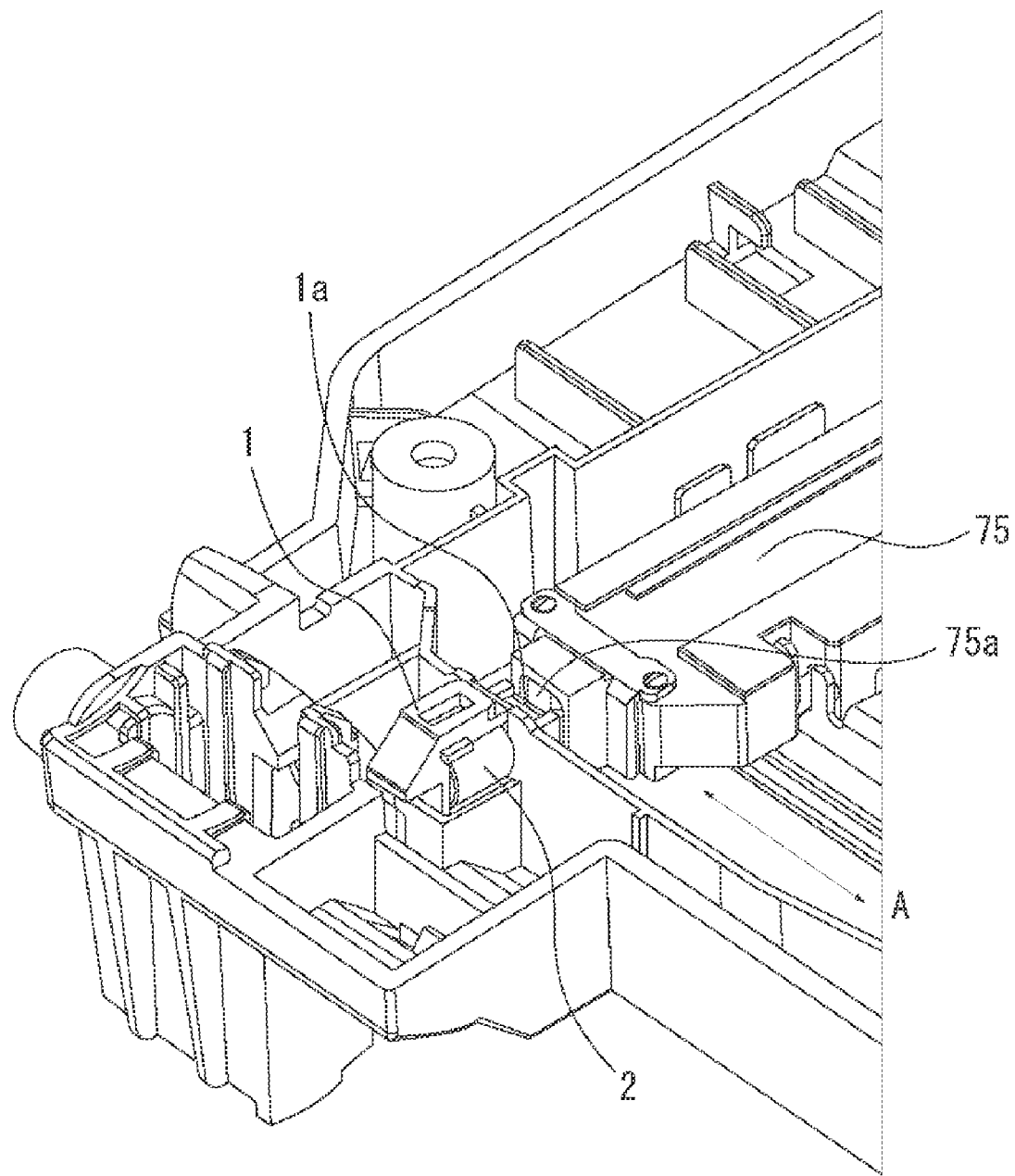
FIG. 5 is a perspective view illustrating a partial enlargement of FIG. 4.

A characteristic configuration of the present invention is described below. FIG. 5 is a perspective view illustrating a partial enlargement of FIG. 4. In FIG. 5, the reading sensor 75 reciprocally moves in the direction A indicated by the arrow in the figure.

A recessed portion 75a is formed at a leading edge of the reading sensor 75. A restricting slider 1 which is movable to a longitudinal direction of the reading sensor 75 (to a direction intersecting the direction A) is arranged in the document reading box 73. The restricting slider 1 is a restricting unit configured to restrict the movement of the reading sensor 75. A spring 2 urges the restricting slider 1 to the direction in which the restricting slider 1 is separated from the reading sensor 75.

When the reading sensor 75 is guided by the shaft 76 to move to a position facing the restricting slider 1, the restricting slider 1 is moved toward the reading sensor 75 against the spring 2 to enable a leading edge 1a of the restricting slider 1 to engage with the recessed portion 75a of the reading sensor 75. The engagement of the leading edge 1a with the recessed portion 75a restricts the movement of the reading sensor 75.

Figure 6:
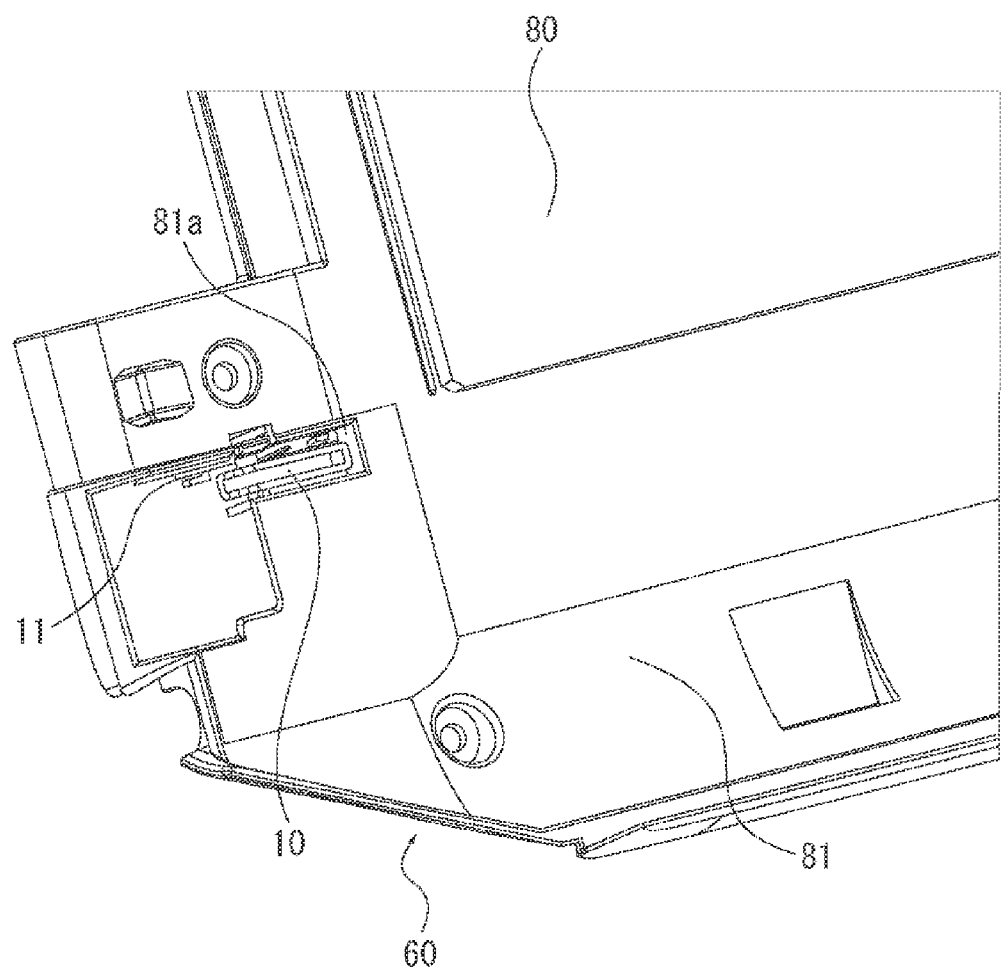
FIG. 6 is a partially enlarged view of a document pressing unit viewed from a document pressing surface thereof.

FIG. 6 is a partially enlarged view of the document pressing unit 60 viewed from the document pressing surface thereof. In FIG. 6, an elastic member 80 directly presses the document placed on the document positioning plate 71. The elastic member 80 is made of a sponge sheet. A document cover 81 supports the elastic member 80 from the other surface thereof to press the document. A lever 10 is rotatably provided on the document cover 81 and held by a spring 11 to be storable in a recessed portion 81a of the document cover 81.

Figure 7:
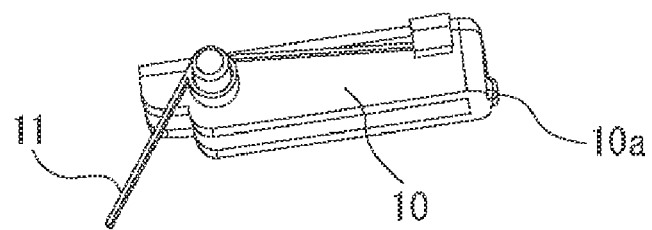
FIG. 7 is a perspective view illustrating how a spring is applied to a lever.

FIG. 7 is a perspective view illustrating how the spring 11 is applied to the lever 10.

Figure 8:
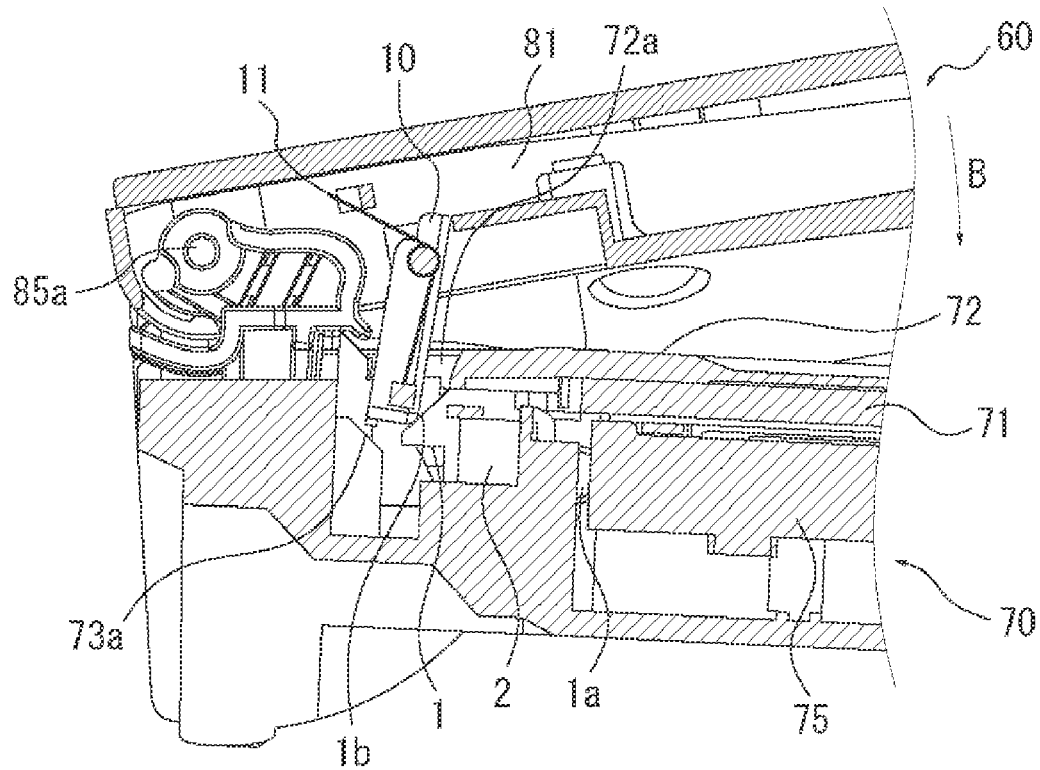
FIG. 8 is a side view illustrating how the lever is arranged in the image reading apparatus.

A detailed operation is described below as to the restriction and release of position in a moving direction of the reading sensor 75 according to the present exemplary embodiment of the present invention. FIG. 8 is a side view illustrating how the image reading apparatus including the document reading unit 70 and the document pressing unit 60 is configured before being transported. The phrase "before being transported" also refers to "before being shipped from a factory."

The document pressing unit 60 is held by a hinge 85 rotatably with respect to the document reading unit 70. The document pressing unit 60 can be rotated around a center 85a of the hinge 85 with respect to the document reading unit 70.

Before the image reading apparatus is shipped from a factory, the lever 10 attached to the document cover 81 is rotated against the spring 11, while the document pressing unit 60 is being rotationally moved in a direction B indicated by an arrow in the figure, and inserted into a hole 72a made in the document reading cover 72. When the document pressing unit 60 is further rotationally moved in the direction B indicated by the arrow in the figure and closed with a part of the lever 10 inserted into the hole 72a, the leading edge of the lever 10 slidingly moves on a slope 1b of the restricting slider 1.

The lever 10 abuts on a slope 73a provided in the document reading box 73 to be fitted into a predetermined position of the document reading box 73 while being rotationally moved. The restricting slider 1 is pushed by the lever 10 to be moved toward the reading sensor 75 against the spring 2.

Figure 9:
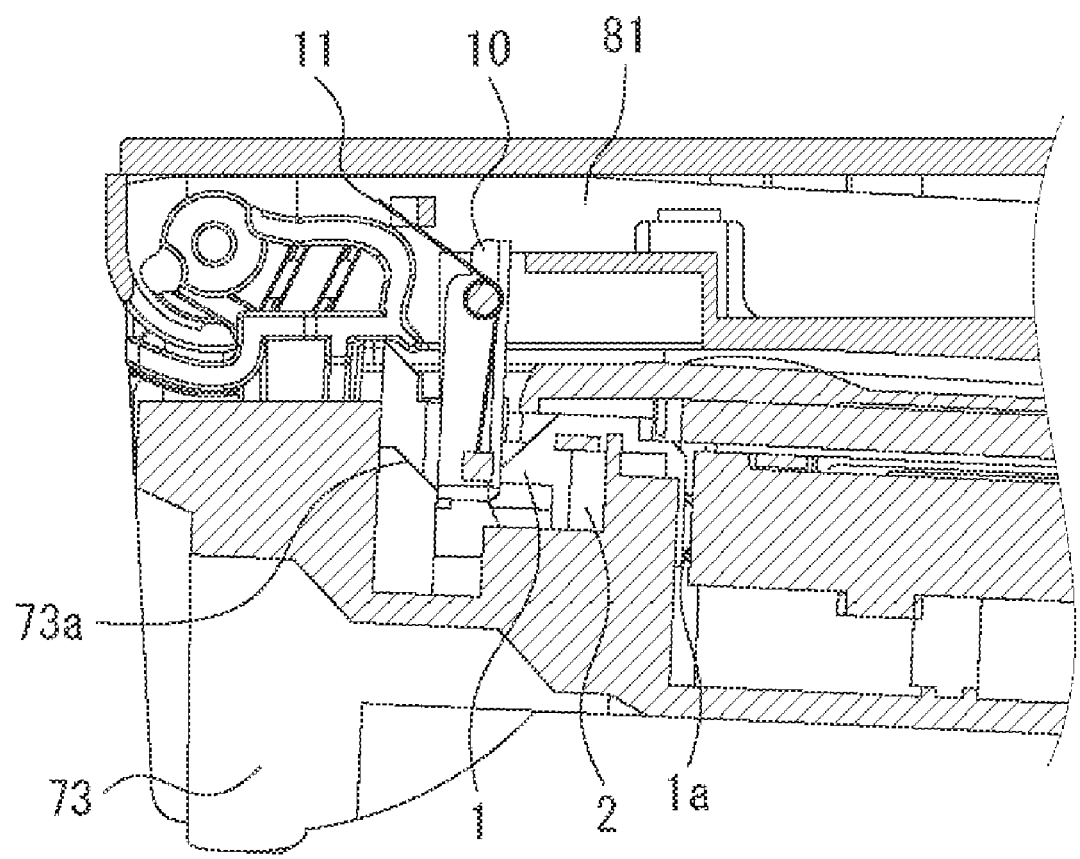
FIG. 9 is a side view illustrating a state where the document pressing unit is completely closed on the image reading apparatus.

FIG. 9 is a side view illustrating a state where the document pressing unit 60 is completely closed on the document reading unit 70. The restricting slider 1 is moved by a predetermined distance by the leading edge of the lever 10. The leading edge 1a of the restricting slider 1 is engaged with the recessed portion 75a of the reading sensor 75 to restrict the movement of the reading sensor 75. The image reading apparatus is shipped from a factory in this condition. Therefore, the reading sensor 75 is never moved in the apparatus while the image reading apparatus is shipped from the factory and transported, so that the apparatus is not damaged.

As described below, the restricting slider 1 can be engaged with the reading sensor 75 by the lever 10 to restrict the movement of the reading sensor 75 at the time of transporting the apparatus as well as at the time of shipping the apparatus from the factory. Although in the above description, the leading edge 1a of the restricting slider 1 is engaged with the recessed portion 75a of the reading sensor 75, a recessed portion and a raised portion may be provided in the leading edge of the restricting slider 1 and on the reading sensor 75 respectively to engage the recessed portion with the raised portion which can also restrict the movement of the reading sensor 75.

Figure 10:
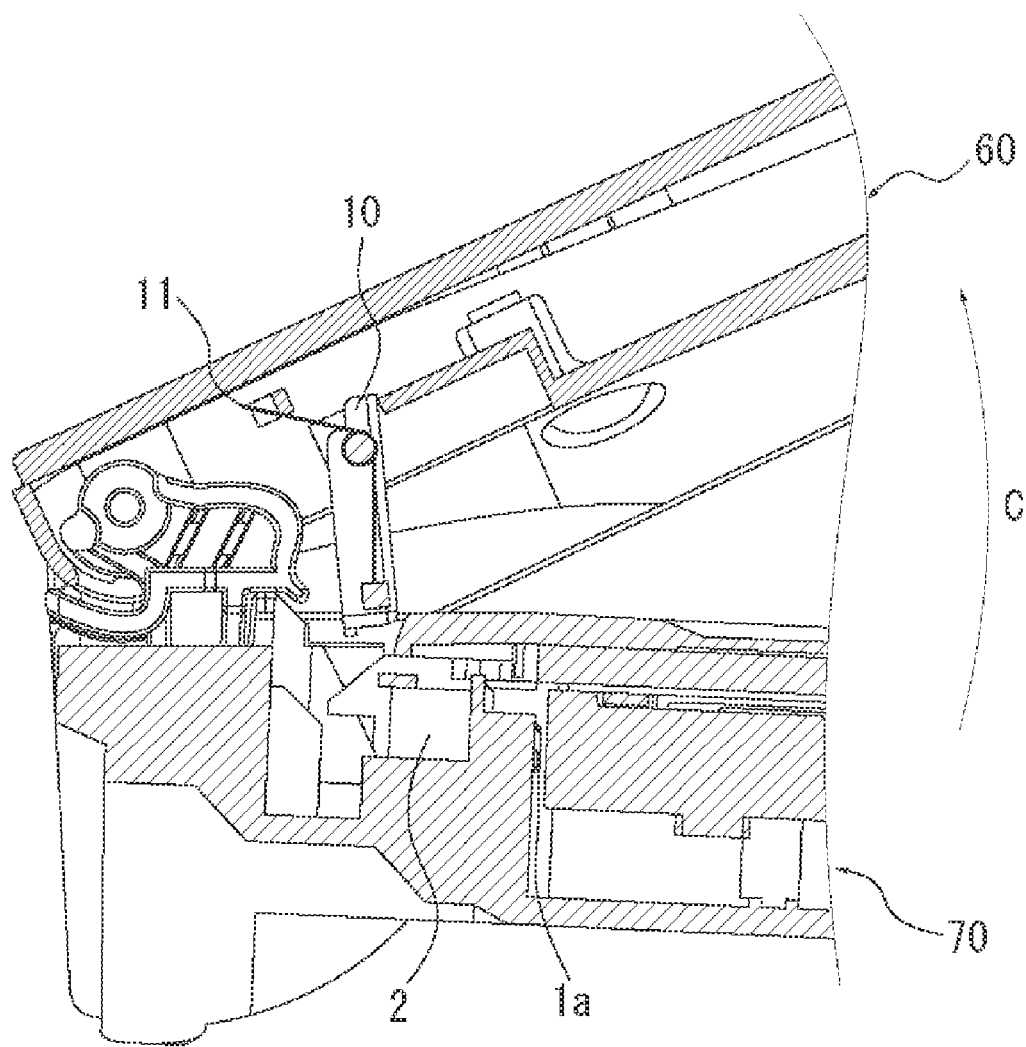
FIG. 10 is a side view illustrating a state where the document pressing unit is opened by a user for the first time after the apparatus has been delivered.

FIG. 10 is a side view illustrating a state where the document pressing unit 60 is opened from the document reading unit 70 by a user for the first time after the apparatus has been delivered. The rotational movement of the document pressing unit 60 in a direction C indicated by an arrow in the figure with respect to the document reading unit 70 allows the lever 10 to be pulled out from a hole 72a of the document reading cover 72. By pulling out the lever 10, the spring 2 pushes the restricting slider 1 to disengage the restricting slider 1 from the reading sensor 75, so that the restriction of movement of the reading sensor 75 is released. Accordingly, the reading sensor 75 can be guided by the shaft 76 and move.

Figure 11:
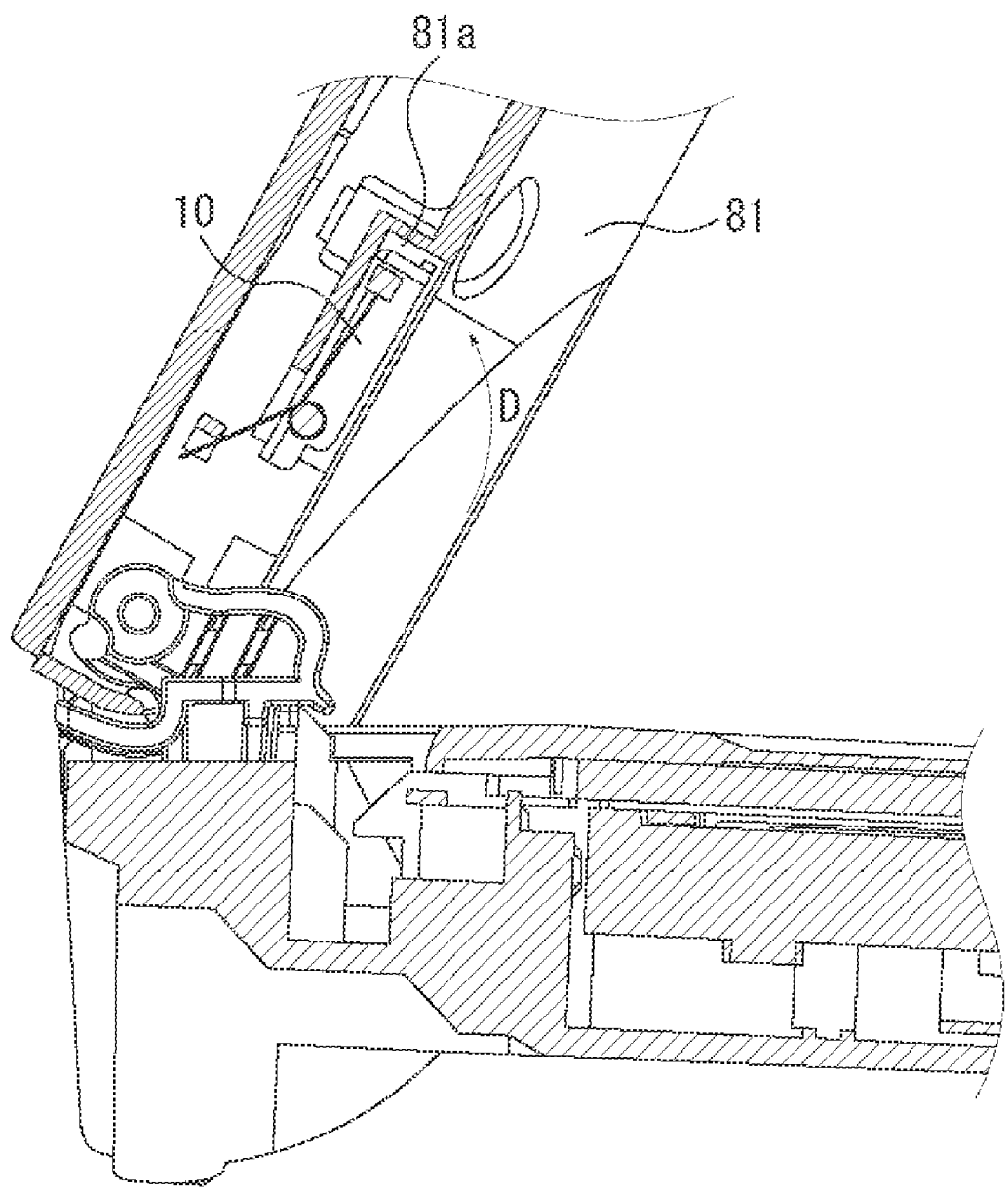
FIG. 11 is a side view illustrating a state where the document pressing unit is completely opened from the image reading apparatus.

FIG. 11 is a side view illustrating a state where the document pressing unit 60 is completely opened from the document reading unit 70. The lever 10 is rotationally moved in a direction D indicated by an arrow in the figure by the spring 11 to be stored in the recessed portion 81a of the document cover 81.

Figure 12:
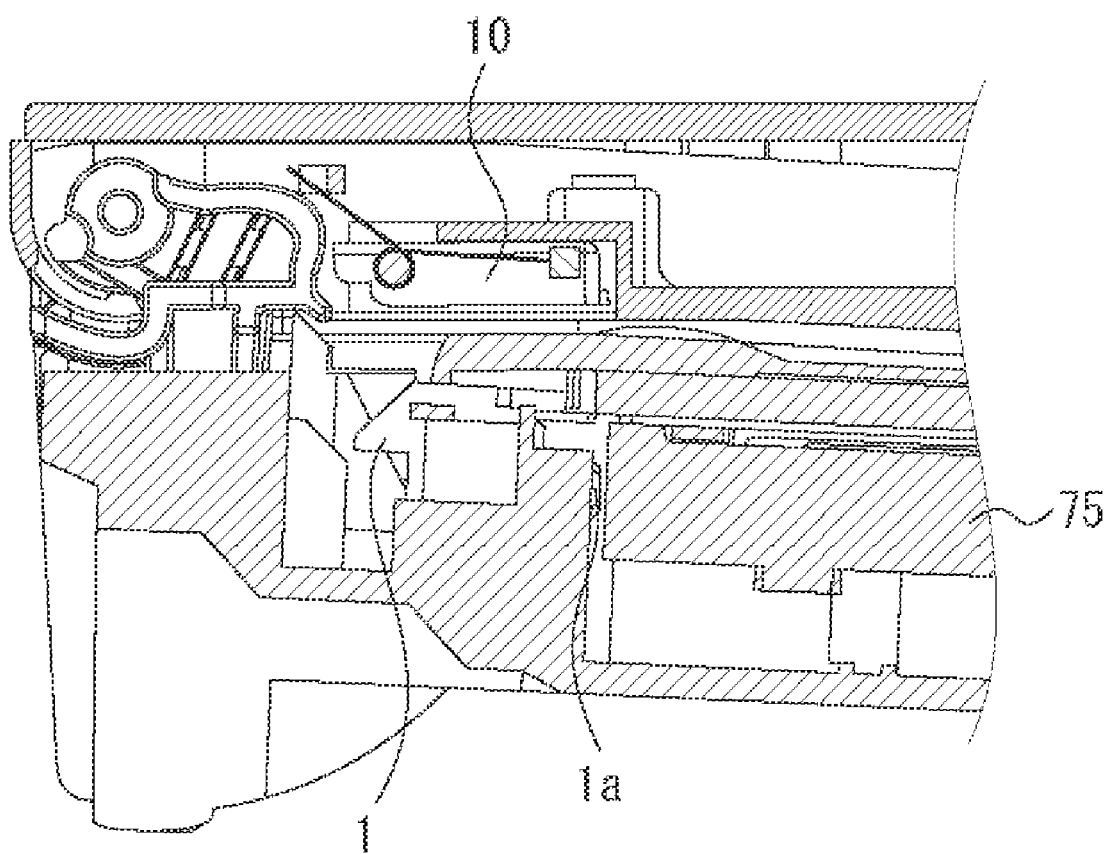
FIG. 12 is a side view illustrating a state where the document pressing unit is opened from the image reading apparatus and then closed thereon.

FIG. 12 is a side view illustrating a state where the document pressing unit 60 is once opened from the document reading unit 70 and then closed thereon. At this moment, the lever 10 is stored in the recessed portion 81a of the document cover 81, so that the lever 10 is never inserted into the hole 72a of the document reading cover 72. Therefore, the movement of the reading sensor 75 is not restricted.

According to the present exemplary embodiment, the document pressing unit 60 is opened from the document reading unit 70 after the apparatus has been delivered, so that the restriction of movement of the reading sensor 75 can be released. Once the restriction of movement of the reading sensor 75 is released, the movement of the reading sensor 75 is never restricted. Thus, the movement of the reading sensor 75 can be restricted in a reading area of the reading sensor 75.

The movement of the reading sensor 75 can be brought into a restricting state when the apparatus is transported other than the time of shipping from the factory. The movement of the reading sensor 75 can be restricted in such a manner that a leading edge 10a of the lever 10 stored in the recessed portion 81a of the document cover 81 is drawn therefrom and inserted into the hole 72a of the document reading cover 72 to cause the lever 10 to engage the restricting slider 1 with the reading sensor 75.

In the above description, the lever 10 slides the restricting slider 1 to engage the restricting slider 1 with the reading sensor 75 and the movement of the reading sensor 75 can be restricted. However, the lever 10 may be directly engaged with the reading sensor 75 to restrict the movement of the reading sensor 75.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-261753 filed Oct. 8, 2008, which is hereby incorporated by reference herein in its entirety.

What is claimed is:

1. An image reading apparatus comprising:
   a document positioning plate configured to position a document thereon;
   a document pressing unit which is attached to the document positioning plate to be openable and closable;
   a reading sensor which is movably arranged in a main body of the apparatus and configured to read an image of the document positioned on the document positioning plate; and
   a restricting unit configured to engage with the reading sensor to restrict a movement of the reading sensor;
   wherein the restricting unit has a lever which is provided in the document pressing unit in a rotatable and storable manner and urged in a direction in which the lever is stored and restricts the movement of the reading sensor in a state that the document pressing unit is closed and the lever is inserted into the main body of the apparatus, and when the document pressing unit is opened from the restricting state, the lever is pulled out from the main body of the apparatus to release the restriction and urged to be stored in the document pressing unit.

2. The image reading apparatus according to claim 1, wherein the restricting unit has a restricting slider and the lever presses the restricting slider to engage the restricting slider with the reading sensor, so that the movement of the reading sensor is restricted.

3. The image reading apparatus according to claim 2, wherein the restricting unit has an urging unit configured to urge the restricting slider in a direction in which the restricting slider is separated from the reading sensor and when the lever is pulled out of the main body of the apparatus, the restricting unit releases the engagement of the restricting slider with the reading sensor.

4. The image reading apparatus according to claim 1, wherein the restricting unit restricts the movement of the reading sensor such that the lever engages with the reading sensor.

5. The image reading apparatus according to claim 1, further comprising a cover member configured to support the document positioning plate, wherein the lever is inserted in a hole made in the cover member to cause the restricting unit to function.

6. The image reading apparatus according to claim 1, wherein, if the document pressing unit is closed with the lever stored, the restricting unit does not function and if the document pressing unit is closed with the lever pulled out against the urging, the restricting unit functions.

7. The image reading apparatus according to claim 1, wherein the reading sensor engages with the restricting unit in a movement area in which the reading sensor reads the document.

8. An image reading and recording apparatus comprising a recording unit configured to record an image on a recording medium by using a recording head and the image reading apparatus according to claim 1.

* * * * *